US011856392B2

(12) United States Patent
Cheng et al.

(10) Patent No.: US 11,856,392 B2
(45) Date of Patent: *Dec. 26, 2023

(54) MULTIPLE INPUT MULTIPLE OUTPUT (MIMO) BASED CONCURRENT SCAN OF NEIGHBOR CELLS

(71) Applicant: QUALCOMM Incorporated, San Diego, CA (US)

(72) Inventors: Steven Cheng, San Diego, CA (US); Remi Gurski, San Diego, CA (US); Kuo-Chun Lee, San Diego, CA (US); Tom Chin, San Diego, CA (US); Guangming Shi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/335,636

(22) Filed: Jun. 1, 2021

(65) Prior Publication Data

US 2021/0289407 A1 Sep. 16, 2021

Related U.S. Application Data

(63) Continuation of application No. 16/692,582, filed on Nov. 22, 2019, now Pat. No. 11,026,139, which is a
(Continued)

(51) Int. Cl.
*H04W 36/00* (2009.01)
*H04B 17/318* (2015.01)
(Continued)

(52) U.S. Cl.
CPC ...... *H04W 36/0094* (2013.01); *H04B 1/1027* (2013.01); *H04B 7/0452* (2013.01);
(Continued)

(58) Field of Classification Search
CPC ............ H04W 36/00; H04W 36/0085; H04W 36/0094; H04W 28/0226; H04W 40/36;
(Continued)

(56) References Cited

U.S. PATENT DOCUMENTS 6,148,203 A 11/2000 Renko et al.
8,730,915 B2* 5/2014 Cheng .................. H04B 7/0452
370/252
(Continued)

FOREIGN PATENT DOCUMENTS

CN 101578778 A 11/2009
EP 2252109 A1 11/2010
(Continued)

OTHER PUBLICATIONS

International Search Report and Written Opinion—PCT/US2012/053987—ISA/EPO—dated Jan. 23, 2013.

*Primary Examiner* — Salvador E Rivas
(74) *Attorney, Agent, or Firm* — ArentFox Schiff LLP

(57) ABSTRACT

Methods, systems, and devices are described for concurrently performing handoff-related measurements for neighbor cells using multiple input multiple output (MIMO) antenna resources. In one example, a mobile device is in communication with a serving cell. Handoff-related measurements of first wireless signals from a first neighbor cell are performed. The first wireless signals are received at first MIMO antenna resources of a device. Handoff-related measurements of second wireless signals from a second neighbor cell are performed, as well. The second wireless signals are received at second MIMO antenna resources concurrently with the first wireless signals received at the first MIMO antenna resources. The first handoff-related measurements and the second handoff-related measurements may be performed during a scan interval. A type of handoff-
(Continued)

related measurement to perform may be determined based on a determined length of the scan interval.

24 Claims, 10 Drawing Sheets

Related U.S. Application Data continuation of application No. 14/258,982, filed on Apr. 22, 2014, now abandoned, which is a continuation of application No. 13/237,675, filed on Sep. 20, 2011, now Pat. No. 8,730,915.

(51) Int. Cl.
| | |
|---|---|
| *H04B 7/0452* | (2017.01) |
| *H04N 21/426* | (2011.01) |
| *H04B 1/10* | (2006.01) |
| *H04W 40/36* | (2009.01) |
| *H04W 36/14* | (2009.01) |
| *H04W 88/06* | (2009.01) |
| *H04B 7/0413* | (2017.01) |
| *H04B 17/382* | (2015.01) |
| *H04B 7/12* | (2006.01) |
| *H04B 3/38* | (2006.01) |
| *H04J 11/00* | (2006.01) |
| *H04B 1/713* | (2011.01) |
| *H04L 5/00* | (2006.01) |
| *H04W 40/02* | (2009.01) |

(52) U.S. Cl.
CPC ..... *H04B 17/318* (2015.01); *H04N 21/42676* (2013.01); *H04W 40/36* (2013.01); *H04B 1/713* (2013.01); *H04B 3/38* (2013.01); *H04B 7/0413* (2013.01); *H04B 7/12* (2013.01); *H04B 17/382* (2015.01); *H04J 11/003* (2013.01); *H04L 5/0023* (2013.01); *H04W 36/00837* (2018.08); *H04W 36/14* (2013.01); *H04W 40/02* (2013.01); *H04W 88/06* (2013.01)

(58) Field of Classification Search
CPC ..... H04W 40/02; H04W 40/08; H04W 40/10; H04B 17/382; H04B 1/1027
See application file for complete search history.

(56) References Cited

U.S. PATENT DOCUMENTS

| | | | |
|---|---|---|---|
| 11,026,139 B2* | 6/2021 | Cheng | H04B 17/318 |
| 2007/0147317 A1* | 6/2007 | Smith | H04W 48/18 |
| | | | 370/338 |
| 2007/0155344 A1 | 7/2007 | Wiessner et al. | |
| 2008/0168500 A1 | 7/2008 | Carlson et al. | |
| 2008/0274742 A1 | 11/2008 | Bi | |
| 2009/0117891 A1* | 5/2009 | Chou | H04W 36/0088 |
| | | | 455/423 |
| 2009/0124224 A1 | 5/2009 | Hildebrand et al. | |
| 2009/0143078 A1* | 6/2009 | Tu | G01S 5/02524 |
| | | | 455/456.3 |
| 2009/0190500 A1 | 7/2009 | Ji et al. | |
| 2009/0280812 A1 | 11/2009 | Cheng et al. | |
| 2009/0291686 A1 | 11/2009 | Alpert et al. | |
| 2010/0085941 A1 | 4/2010 | Chin et al. | |
| 2010/0111214 A1 | 5/2010 | Chin et al. | |
| 2010/0190487 A1 | 7/2010 | Wang et al. | |
| 2010/0316155 A1 | 12/2010 | Reinhold | |
| 2010/0322079 A1 | 12/2010 | Kitazoe et al. | |
| 2011/0075630 A1 | 3/2011 | Riess | |
| 2011/0105112 A1 | 5/2011 | Cave et al. | |
| 2011/0269459 A1* | 11/2011 | Koo | H04W 24/10 |
| | | | 455/434 |
| 2011/0310939 A1* | 12/2011 | Rofougaran | H01Q 21/30 |
| | | | 375/219 |
| 2014/0228028 A1 | 8/2014 | Cheng et al. | |

FOREIGN PATENT DOCUMENTS

| | | |
|---|---|---|
| WO | 2008149534 A1 | 12/2008 |
| WO | 2010053928 A1 | 5/2010 |

* cited by examiner understand# MULTIPLE INPUT MULTIPLE OUTPUT (MIMO) BASED CONCURRENT SCAN OF NEIGHBOR CELLS

CLAIM OF PRIORITY

The present application for patent is a Continuation Application of U.S. Ser. No. 16/692,582, filed Nov. 22, 2019, entitled, "MULTIPLE INPUT MULTIPLE OUTPUT (MIMO) BASED CONCURRENT SCAN OF NEIGHBOR CELLS", which is a Continuation Application of U.S. Ser. No. 14/258,982, filed Apr. 22, 2014, entitled "MULTIPLE INPUT MULTIPLE OUTPUT (MIMO) BASED CONCURRENT SCAN OF NEIGHBOR CELLS," which is a Continuation Application of U.S. Ser. No. 13/237,675, filed Sep. 20, 2011, entitled "MULTIPLE INPUT MULTIPLE OUTPUT (MIMO) BASED CONCURRENT SCAN OF NEIGHBOR CELLS," all of which are assigned to the assignee hereof and hereby expressly incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. Mobile devices desiring to enter the coverage area of a base station may initiate contact to establish communications with the base station. For example, when a mobile device desires to enter the coverage area of a target base station, the mobile device may initiate handoff procedures to terminate communication with a base station the device is currently communicating with and establish a new communications link with the target base station. The handoff procedure includes sending an initial transmission to the target base station. When the target base station receives the initial transmission, it may communicate a response to the mobile device with transmission-related information that enables the mobile device and the target base station to establish a communications channel.

A handoff procedure may result in the mobile device being handed off from a base station that used a particular radio access technology (RAT) to a base station that uses a different RAT. Before the handoff procedure is initiated, the mobile device may measure the quality of the signals received from potential target base stations. These measurements may be executed during a specific time period. Often, the time period is relatively short and this may impact the ability of the mobile device to measure signals of potential target base stations that use a different RAT or different frequency.

SUMMARY

Systems, methods, device, and computer-readable products are described for concurrently scanning neighbor cells using MIMO based antenna resources. In one example, neighbor cells are identified for scanning. A length of a scan interval may be detected. A first set of handoff-related measurements are performed on wireless signals received from a first neighbor cell at first MIMO antenna resources. A second set of handoff-related measurements are concurrently performed on wireless signals received at second MIMO antenna resources from a second neighbor cell. For example, the first and/or second handoff-related measurements may be power measurements or signal quality measurements. In one configuration, the type of handoff-related measurement to be performed may be based on the determined length of the scan interval. In one example, the first handoff-related measurements and the second handoff-related measurements may be performed during the scan interval. In addition, a determination may be made as to whether the device is in a connect mode or an idle mode. The type of handoff-related measurement to be performed may also be based on the determined mode of the device.

In one configuration, the first handoff-related measurements may be a power measurement and the second handoff-related measurements may be a signal quality measurement. In one example, the signal quality measurements may include a signal-to-noise ratio (SNR), a carrier to interference-plus-noise-ratio (CINR), a bit error ratio (BER), an energy per bit to noise power spectral density ratio ($E_b/N_O$), or an energy per symbol per noise power spectral density ratio ($E_S/N_O$).

In one example, a first downlink message received at the first MIMO antenna resources from the first neighbor cell may be decoded. Further, a second downlink message received at the second MIMO antenna resources from the second neighbor cell may also be decoded. In one configuration, the messages may be decoded when the device is in an idle mode.

The first neighbor cell may be in a different frequency band from the serving cell. In addition, the second neighbor cell may be in a different frequency band from the serving cell. A receiver associated with the first MIMO antenna resources may be tuned during a first period of the scan interval to the frequency band of the first neighbor cell. Further, a receiver associated with the second MIMO antenna resources may be tuned during the first period of the scan interval to the frequency band of the second neighbor cell. In one configuration, the receiver associated with the first MIMO antenna resources and the receiver associated with the second MIMO antenna resources may be tuned to the frequency band of the serving cell during a second period of the scan interval.

In one example, the first neighbor cell may include a first radio access technology (RAT) and the second neighbor cell may also include the first RAT. In one configuration, the serving cell may also include the first RAT. In another example, the second neighbor cell may include a second RAT that is different from the first RAT. The second neighbor cell may also operate in a different frequency band than the serving cell.

A device to concurrently scan neighbor cells using MIMO based antenna resources is also described. The device may include a plurality of multiple input multiple output (MIMO) antenna resources, and a transceiver coupled with the plurality of MIMO antenna resources. The device may also include a detection module in communication with the transceiver. The detection module may determine a length of a scan interval. The device may further include a measurement module coupled with the transceiver. The measurement module may determine a type of handoff-related measurement to perform based on the determined length of the scan interval. The measurement module may perform first handoff-related measurements of first wireless signals from a first neighbor cell received at first MIMO antenna resources of the plurality of MIMO antenna resources. The device may be in communication with a serving cell. The measurement module may also perform second handoff-related measurements of second wireless signals from a second neighbor cell received at second MIMO antenna resources of the plurality of MIMO antenna resources. The second wireless signals may be received at the second MIMO antenna resources concurrently with the first wireless signals being received at the first MIMO antenna resources.

An apparatus to concurrently scan neighbor cells using MIMO based antenna resources is also described. The apparatus may include means for determining a type of handoff-related measurement to perform based on a determined length of a scan interval. The apparatus may include means for performing first handoff-related measurements of first wireless signals from a first neighbor cell received at first multiple input multiple output (MIMO) antenna resources of a device. The device may be in communication with a serving cell. The apparatus may further include means for performing second handoff-related measurements of second wireless signals from a second neighbor cell received at second MIMO antenna resources of the device. The second wireless signals may be received at the second MIMO antenna resources concurrently with the first wireless signals being received at the first MIMO antenna resources.

A computer program product to concurrently scan neighbor cells using MIMO based antenna resources is also described. The product may include a non-transitory computer-readable medium. The medium may include code for determining a type of handoff-related measurement to perform based on a determined length of a scan interval. The medium may include code for performing first handoff-related measurements of first wireless signals from a first neighbor cell received at first multiple input multiple output (MIMO) antenna resources of a device. The device may be in communication with a serving cell. The computer-readable medium may further include code for performing second handoff-related measurements of second wireless signals from a second neighbor cell received at second MIMO antenna resources of the device. In one example, the second wireless signals may be received at the second MIMO antenna resources concurrently with the first wireless signals being received at the first MIMO antenna resources.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
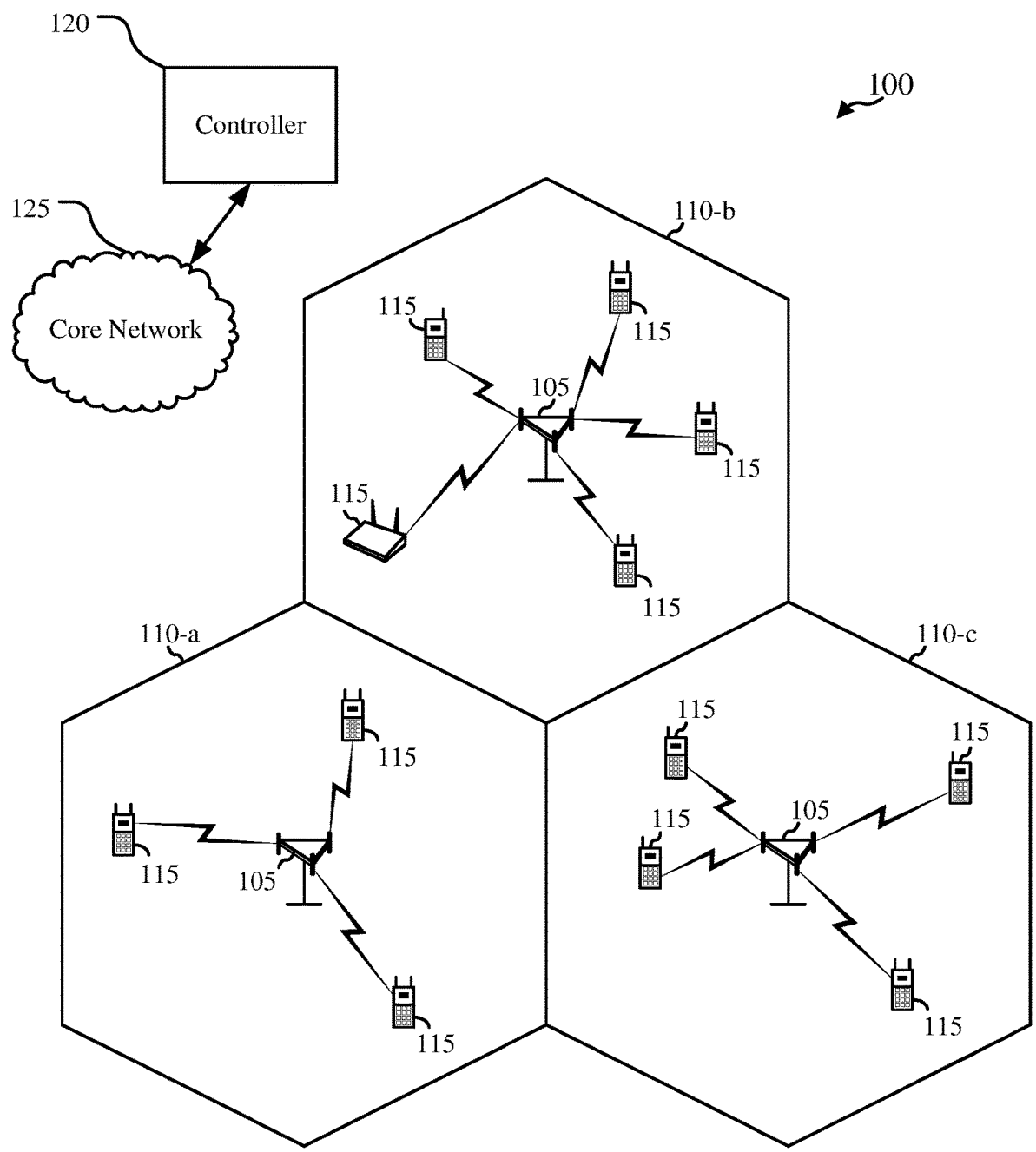
FIG. 1 is a block diagram of a wireless communications system.

Concurrent scanning of wireless signals using multiple input multiple output (MIMO) antenna resources on a multimode device is described. The scan procedure performed by the MIMO antenna resources may be implemented to measure certain characteristics of signals received from neighbor cells. The measured characteristics may be related to procedures to handoff the mobile device from one base station to another. For example, the device may be in communication with a serving cell. While in communication with the serving cell, the device may receive first wireless signals from a first neighbor cell during a scan interval and perform first handoff-related measurements of the first wireless signals using a first set of MIMO antenna resources. In addition, the device may receive second wireless signals from a second neighbor cell during the scan interval. The device may perform second handoff-related measurements of the second wireless signals using a second set of MIMO antenna resources. The device may receive and measure the first wireless signals concurrently with the receipt and measurement of the second wireless signals. In one example, the results of the scan procedure may be used by either the serving cell or the device to determine whether to perform a handoff procedure.

As used herein the term "serving cell" may be used interchangeably with the term "serving base station". Similarly, the term "neighbor cell" may be used interchangeably with the term "neighbor base station".

The device may be a multi-mode device that is capable of supporting various wireless communications systems such as CDMA, TDMA, FDMA, OFDMA, SC-FDMA, and other systems. The terms "system" and "network" are often used interchangeably. A CDMA system may implement a radio access technology (RAT) such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a RAT such as Global System for Mobile Communications (GSM). An OFDMA system may implement a RAT such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). Currently, neighbor cell measurements obtained during a scan interval are limited to neighbor cells using a frequency band or radio access technology (RAT) associated with the serving cell. For example, if the serving cell is within a WiMAX network, current standards limit the neighbor cell measurements to neighbor cells using WiMAX-based RATs and operating in a frequency band within the WiMAX network. The architecture of the device described herein allows the device to continue to obtain measurements of neighbor cells using a frequency band and RAT associated with the serving cell, while, during the same scan interval, obtain measurements of neighbor cells that use frequency bands or RATs that are different than those used by the serving cell.

The techniques described herein may be used for the systems and RATs mentioned above as well as other systems and RATs. Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105 (or cells), mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 may communicate with the mobile devices 115 under the control of the base station controller 120 via multiple carriers. Each of the base station 105 sites may provide communication coverage for a respective geographic area. The coverage area for each base station 105 here is identified as 110-$a$, 110-$b$, or 110-$c$. The coverage area for a base station may be divided into sectors (not shown, but making up only a portion of the coverage area). The system 100 may include base stations 105 of different types (e.g., macro, micro, and/or pico base stations). There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones and wireless communications devices, but may also include personal digital assistants (PDAs), other handheld devices, netbooks, notebook computers, etc.

The base stations 105 may provide different RATs. For example, one base station may provide WiMAX based RATs while another base station may provide CDMA based RATs. In one configuration, the mobile devices 115 may be multi-mode devices, thereby allowing them to use both WiMAX based RATs and CDMA based RATs, for example. In order to transition from a serving cell providing WiMAX based RATs to a neighbor cell providing CDMA based RATs, the mobile devices 115 may calculate handoff-related measurements for the neighbor cell before handoff procedures are initiated. The mobile devices 115 described herein include an architecture that allows them to perform concurrent scanning procedures (i.e., handoff-related measurements) of multiple base stations providing different RATs during a single scan interval. For example, the mobile devices 115 may include an architecture that allows them to perform measurements of the wireless signals received from neighbor base stations that provide the same RATs as provided by the serving base station (e.g., WiMAX based RATs) while, in parallel, performing measurements of the wireless signals received from neighbor base stations that provide different RATs (e.g., CDMA based RATs).

Figure 2:
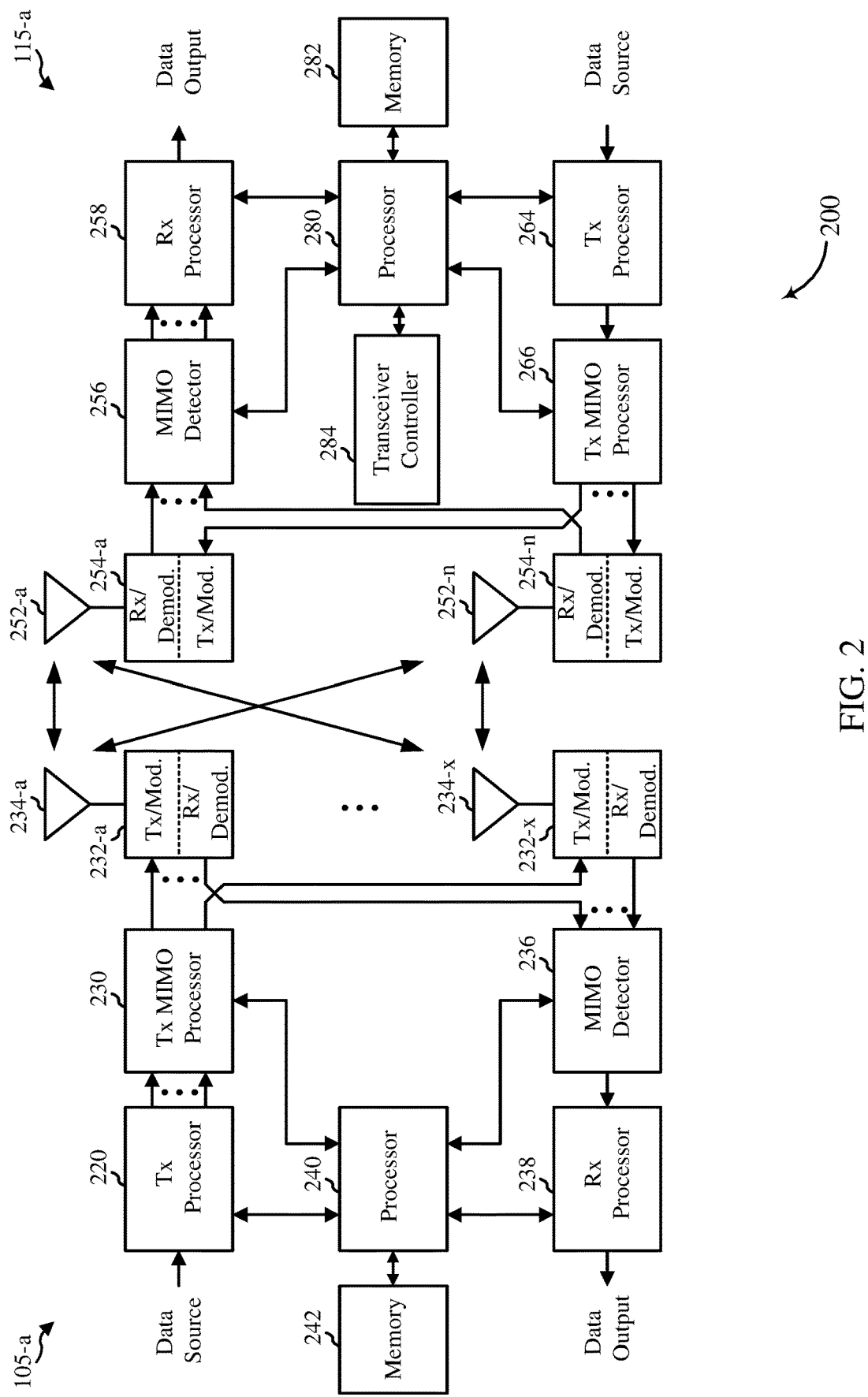
FIG. 2 is a block diagram of a system including a base station and a mobile device.

FIG. 2 is a block diagram of a system 200 including a base station 105-$a$ and a mobile device 115-$a$. This system 200 may be an example of the system 100 of FIG. 1. The base station 105-$a$ may be equipped with antennas 234-$a$ through 234-$x$, and the mobile device 115-$a$ may be equipped with antennas 252-$a$ through 252-$n$. At the base station 105-$a$, a transmit processor 220 may receive data from a data source.

The transmit processor 220 may process the data. The transmit processor 220 may also generate reference symbols, and a cell-specific reference signal. A transmit (TX) MIMO processor 230 may perform spatial processing (e.g., precoding) on data symbols, control symbols, and/or reference symbols, if applicable, and may provide output symbol streams to the transmit modulators 232-$a$ through 232-$x$. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink (DL) signal. In one example, DL signals from modulators 232-$a$ through 232-$x$ may be transmitted via the antennas 234-$a$ through 234-$x$, respectively.

At the mobile device 115-a, the mobile device antennas 252-a through 252-n may receive the DL signals from the base station 105-a and may provide the received signals to the demodulators 254-a through 254-n, respectively. Each demodulator 254 may condition (e.g., filter, amplify, down-convert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive processor 258 may process (e.g., demodulate, deinterleave, and decode) the detected symbols, providing decoded data for the mobile device 115-a to a data output, and provide decoded control information to a processor 280, or memory 282.

The mobile device 115-a may include a transceiver controller 284 that may determine which antennas 252 receive signals from certain base stations 110. For example, the transceiver controller 284 may activate a first antenna 252-a to receive DL signals from the base station 105-a, wherein the base station 105-a may be currently serving the mobile device 115-a. The base station 105-a and mobile device 115-a may, therefore, be using the same frequency band and/or the same RAT. While the first antenna 252-a is receiving signals from the base station 105-a, the transceiver controller 284 may also activate another antenna 252-n to receive DL signals from another base station servicing a different geographical area than where the mobile device 115-a is currently located. As a result, the other base station and the mobile device 115-a may not be using the same frequency band and/or the same RAT. In various examples, the transceiver controller 284 may activate both sets of antennas during the same scan interval so that the antennas receive the signals from different base stations during the same time interval.

On the uplink (UL), at the mobile device 115-a, a transmit processor 264 may receive and process data from a data source. The transmit processor 264 may also generate reference symbols for a reference signal. The symbols from the transmit processor 264 may be precoded by a transmit MIMO processor 266 if applicable, further processed by the demodulators 254-a through 254-n (e.g., for SC-FDMA, etc.), and be transmitted to the base station 105-a in accordance with the transmission parameters received from the base station 105-a. At the base station 105-a, the UL signals from the mobile device 115-a may be received by the antennas 234, processed by the demodulators 232, detected by a MIMO detector 236 if applicable, and further processed by a receive processor. The receive processor 238 may provide decoded data to a data output and to the processor 240.

Figure 3:
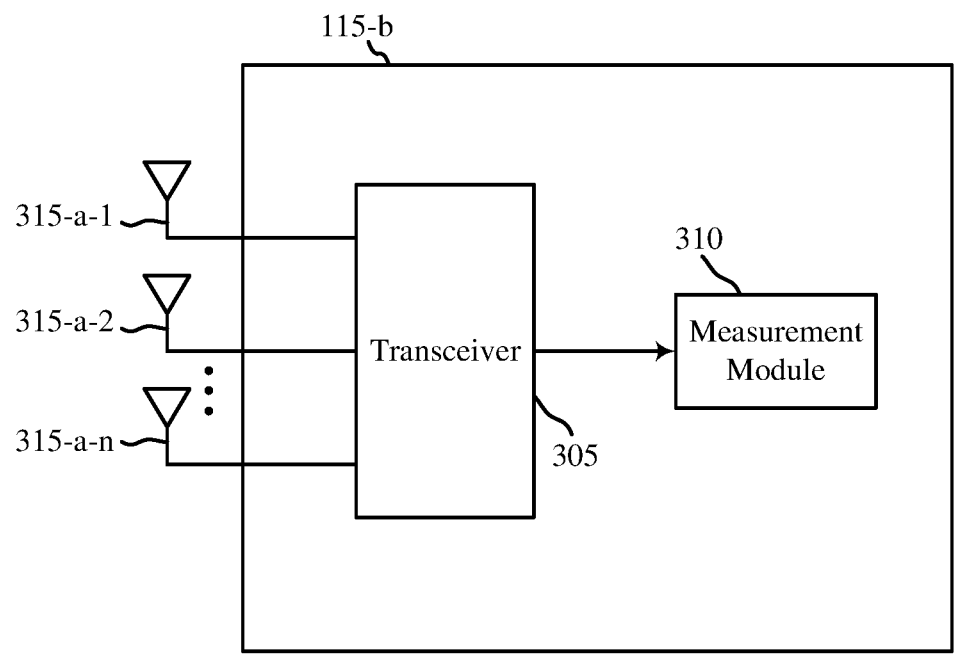
FIG. 3 is a block diagram illustrating one configuration of the mobile device.

Referring now to FIG. 3, a block diagram illustrates one configuration of a mobile device 115-b. The mobile device 115-b may be an example of the mobile device 115 of FIG. 1 or 2. The device 115-b may include a number of antennas 315 coupled to a transceiver 305. The number of antennas 315 may be MIMO based antennas that receive/transmit signals from/to base stations. The antennas 315 may receive signals from different base stations concurrently. For example, a first MIMO antenna 315-a-1 may receive signals a from first base station simultaneously with a second MIMO antenna 315-a-2 receiving different signals from a second base station. In another example, the first MIMO antenna 315-a-1 may begin to receive signals and the second MIMO antenna 315-a-2 may begin to receive signals at a later time, during which the first MIMO antenna 315-a-1 is still receiving the signals. As a result, the terms "concurrently" and "in parallel" as used herein and in connection with other Figures may mean simultaneously and/or overlapping.

The base stations may be operating in a frequency band that is the same or different than the frequency band used by the base station currently serving the mobile device 115-b. In another example, the base stations may provide a RAT that is different than the RAT currently being to the mobile device 115-b from the serving base station.

The signals received by the antennas 315 may be analyzed by a measurement module 310. The measurement module 310 may determine various characteristics of the received signals. The mobile device 115-b may use the determined characteristics to determine whether to engage in a handoff to a neighbor base station. For example, the mobile device 115-b may be in communication with a serving base station. The antennas 315 may receive signals from a number of neighbor base stations during a scan interval. The scan interval represents a time period where there is a break in communication between the mobile device 115-b and the serving base station. The measurement module 310 may analyze the signals received from the neighbor base stations, and the mobile device 115-b may determine whether to cease communications with the serving base station and establish communications with one of the neighbor base stations based on the characteristics of the signals analyzed by the measurement module 310.

Figure 4A:
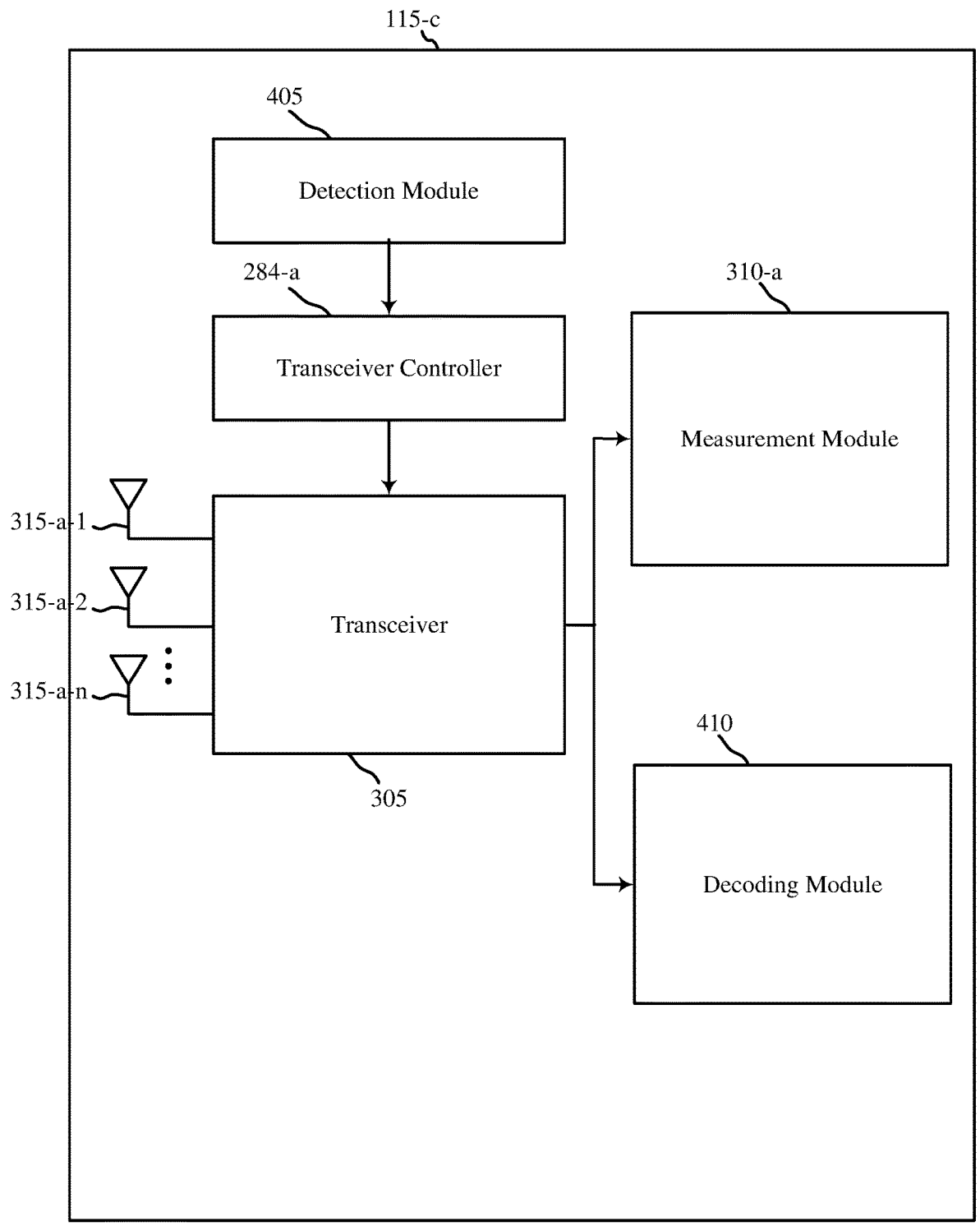
FIG. 4A shows one example of the mobile device.

FIG. 4A, is a block diagram illustrating one example of the mobile device 115-c. The mobile device 115-c may be an example of the mobile device 115 of FIG. 1, 2, or 3. In one configuration, the mobile device 115-c may include a detection module 405, a transceiver 305, a number of antennas 315, a decoding module 410, a measurement module 310-a, and a transceiver controller 284-a. The measurement module 310-a may be an example of the measurement module 310 of FIG. 3. The transceiver controller 284-a may be an example of the transceiver controller 284 of FIG. 2.

In one example, the detection module 405 may analyze certain information relating to scanning procedures initiated by the mobile device 115-c. The detection module 405 may also detect characteristics of neighbor base stations and the serving base station. Information detected by the detection module 405 may be communicated to the transceiver controller 284-a. The controller 284-a may control or regulate the transceiver 305 and the antennas 315. For example, the controller 284-a may determine which antenna(s) 315 should receive signals from the serving base station and which antenna(s) 315 should receive and process signals from the neighbor base stations. The controller 284-a may determine which antenna(s) 315 should receive and process signals on different frequencies. The controller 284-a may determine which antenna(s) should perform power measurements or signal quality measurements based on the length of the scan interval, and on whether (and how much) tuning is required. The measurement module 310-a and the decoding module 410 may analyze the signals received by the antennas 315-a.

In one example, the measurement module 310-a may identify properties of the neighbor base stations based on an analysis of the signal received from each base station. For example, the measurement module 310-a may measure the strength of the signals received from the neighbor base stations. The decoding module 410 may decode data that may be encoded in a signal received from a neighbor base station. For example, data identifying a neighbor base station may be encoded in the signal. In addition, timing information, power characteristics, offset information, etc. for the neighbor cell may also be encoded in the signal. Performing measurements or decoding signals from various neighbor base stations may occur in parallel during a scan interval. For example, the measurement module 310-a may perform measurements of signals received from one neighbor base station during a scan interval while the decoding module 410 decodes signals received from another neighbor base station during the same scan interval.

Figure 4B:
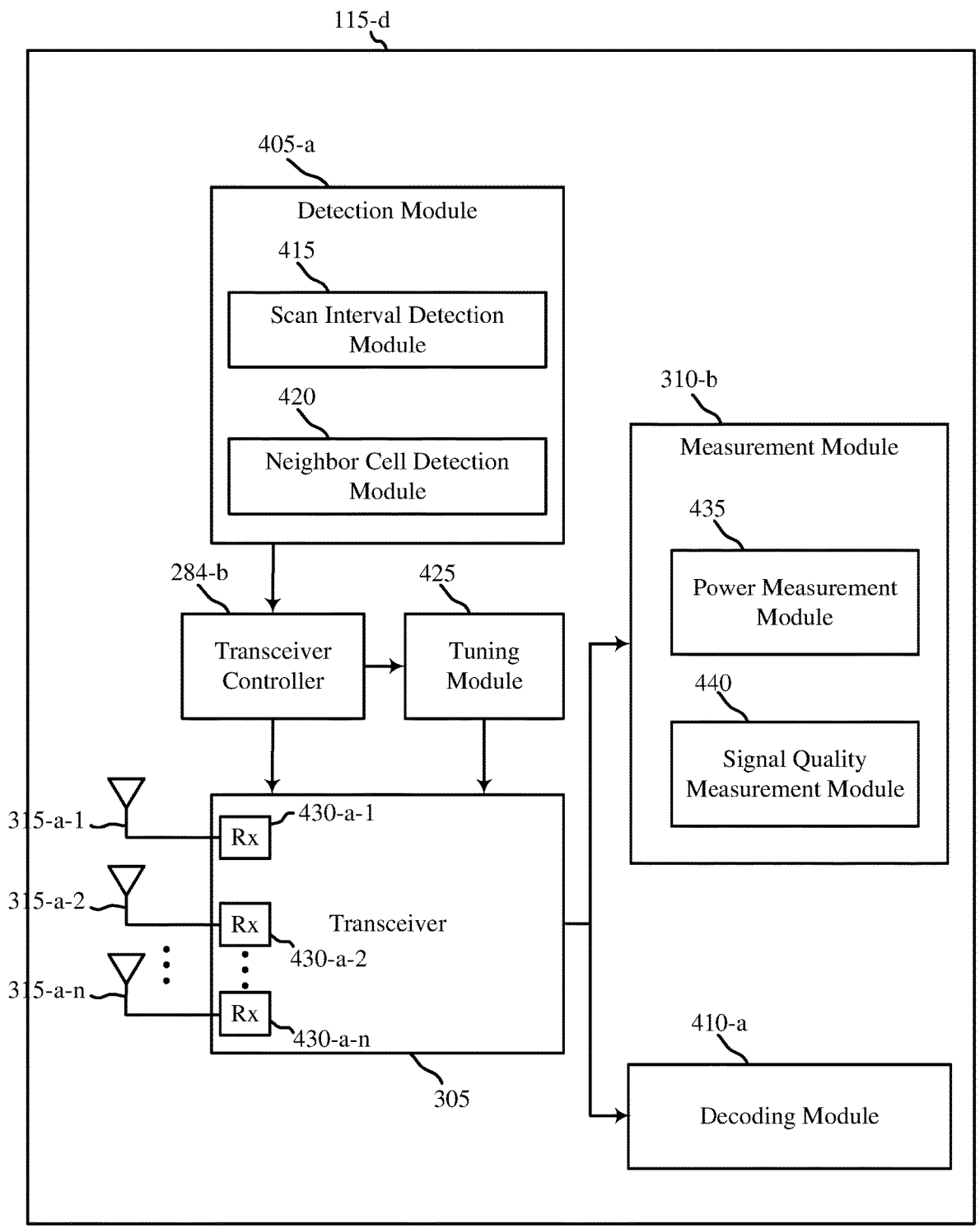
FIG. 4B illustrates a further example of the mobile device.

Referring now to FIG. 4B, a block diagram illustrates mobile device 115-d. The mobile device 115-d may be an example of the mobile device 115 of FIG. 1, 2, 3, or 4A. The device 115-d may include a detection module 405-a, a transceiver controller 284-b, a tuning module 425, a transceiver 305, a number of MIMO based antennas 315, a number of receivers 430 associated with each of the antennas 315, a measurement module 310-b, and a decoding module 410-a.

The detection module 405-a may include a scan interval detection module 415 and a neighbor cell detection module 420. In one example, the device 115-d may have an established communications channel with a serving base station. The neighbor cell detection module 420 may identify neighbor base stations (e.g., serving different geographical areas than the serving cell). The neighbor cell detection module 420 may identify whether the neighbor base stations are operating in the same frequency band as the serving base station. The neighbor cell detection module 420 may further detect whether the neighbor base stations are functioning with the same RAT as the serving base station.

The device 115-d may perform a scan procedure to determine whether a handoff procedure should be initiated. The scan procedure, which includes performing handoff-related measurements of signals received from neighbor base stations, may be performed during a scan interval. The scan interval detection module 415 may detect the commencement of the scan interval as well as the length of the scan interval.

Information detected by the detection module 405-a may be communicated to the transceiver controller 284-b. The controller 284-b may determine which MIMO antennas 315 receive signals from neighbor base stations sharing the same frequency and RAT as the serving base station, and which MIMO antennas 315 receive signals from neighbor base stations that operate in a different frequency band and RAT. The controller 284-b may also determine the type of measurements to perform on the received signals. The transceiver controller 284-b may base this determination on the length of the scan interval. For example, the scan interval may be determined to be a very short time period. The controller 284-b may determine that signals received from some or all of the neighbor base stations should be analyzed to determine a power measurement of the signals. The power measurement may be determined by a power measurement module 435 within the measurement module 310-b. An example of the power measurement of the received signal may be a received signal strength indicator (RSSI).

In another example, the scan interval detection module 415 may determine that the scan interval has a longer time period. The transceiver controller 284-b may provide instructions that signals received from some or all of the neighbor base stations should be analyzed to calculate a signal quality measurement. The signal quality measurement may be calculated by a signal quality measurement module 440. Examples of the a signal quality measurement may include signal-to-noise ratio (SNR), carrier to interference-plus-noise ratio (CINR), a bit error ratio (BER), an energy per bit to noise power spectral density ratio ($E_b/N_o$), an energy per symbol per noise power spectral density ratio ($E_S/N_O$), a carrier-to-receiver noise density ratio (C/kT), or a modulation error ratio (MER).

In one configuration, the scan interval may be an even longer time period. Signals received from neighbor base stations may include a DL encoded message that includes information regarding the neighbor base station. During a long scan interval, these encoded messages may be decoded by the decoding module 410-a to extract the information from the message about a neighbor base station. The extracted information may include identification information for the neighbor base station. The information may also provide power characteristics, timing parameters, etc. for the neighbor base station. The mobile device 115-d may use the decoded information to successfully handoff from the serving base station to the selected neighbor base station.

In one example, a neighbor station may operate in a different frequency band or RAT than the serving base station. Before signals are received at an antenna 315 from the neighbor base station, the tuning module 425 may tune a receiver 430 associated with the antenna 315. The receiver may be tuned to the frequency band of the neighbor base station. In one configuration, the tuning module 425 may perform the tuning during a portion of the scan interval. After the receiver 430 is tuned to the neighbor base station operating in the different frequency band, the antenna 315 may receive the signals from the neighbor base station and the measurement module 310-b may proceed to perform a handoff-related measurement of the received signals. Upon completing the handoff-related measurements of the signals, the tuning module 425 may tune the receiver 430 back to the frequency band of the serving base station.

In one configuration, the tuning module 425 may not tune receivers associated with antennas 315 that receive signals during the scan interval from neighbor base stations that operate in the same frequency or RAT as the serving base station As a result, during the scan interval, the antennas 315 may concurrently receive signals from neighbor base stations that operate in the same or different frequency band as the serving station and provide the same or different RAT as the serving base station.

Figure 5:
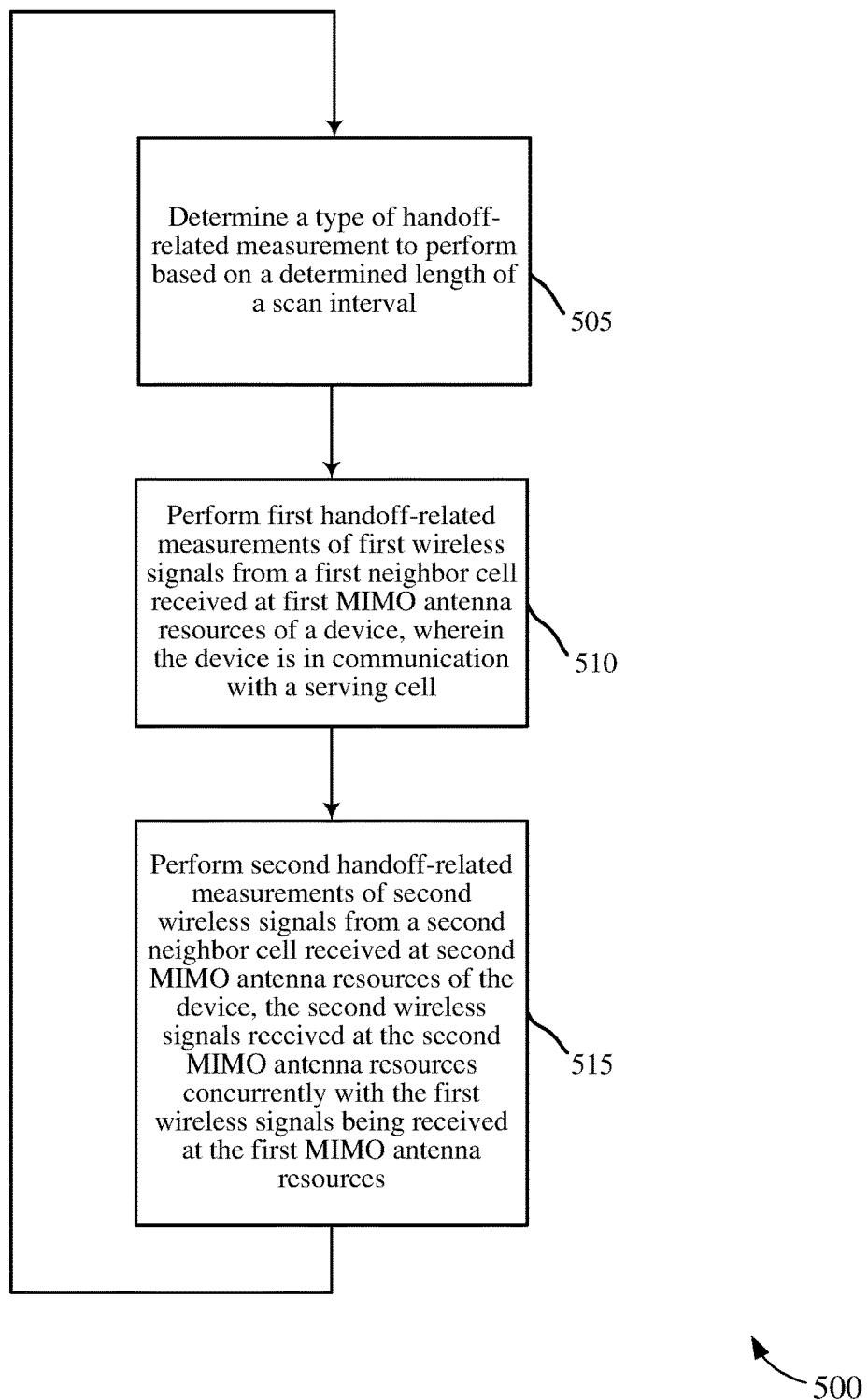
FIG. 5 is a flow chart illustrating one example of a method to concurrently perform a scan procedure of multiple neighbor cells using MIMO based antenna resources.

FIG. 5 is a flow chart illustrating one example of a method 500 to concurrently perform a scan procedure of multiple neighbor cells using MIMO based antenna resources. The method 500 may be implemented by a mobile device, such as the mobile device 115 of FIG. 1, 2, 3, 4A, or 4B. In the example, the method 500 may be implemented by the transceiver 305 and the measurement module 310 of FIG. 3.

At block 505, a type of handoff-related measurement to perform may be determined based on a determined length of a scan interval. The detection module 405 may determine the length of the scan interval. The measurement module 310 may determine the type of measurement to perform based on the scan interval length. At block 510, first handoff-related measurements of first wireless signals may be performed. The first wireless signals may be received at first MIMO antenna resources of the device 115, such as a first antenna 315-a-1 of FIG. 3. The first wireless signals may be transmitted from a first neighbor cell to the first MIMO antenna 315-a-1. In one configuration, the device 115 may be in communication with a serving cell.

At block 515, second handoff-related measurements of second wireless signals may be performed. In one example, the second wireless signals may be received at second MIMO antenna resources of the device, such as a second antenna 315-a-2 of FIG. 3. The second wireless signals may be transmitted from a second neighbor cell. In one configuration, the second MIMO antenna resource 315-a-2 may receive the second wireless signals concurrently with the first wireless signals being received at the first MIMO antenna resource 315-a-1. As previously explained, "concurrently" may be interpreted to mean that first signals and second signals are received during overlapping time periods at the respective MIMO antennas. Thus, "concurrently" may mean that the first MIMO antenna resources 315-a-1 may begin to receive the first wireless signals and at a later time, while the first MIMO antenna resources 315-a-1 are still receiving the first wireless signals, the second MIMO antenna resources 315-a-2 may begin to receive the second wireless signals. As a result, the receipt of the signals at their respective antennas may overlap.

Therefore, the method 500 may provide for scanning signals in parallel from multiple neighbor base stations using MIMO based antenna resources 315 of a mobile device 115. It should be noted that the method 500 is just one implementation and that operations of the method 500 may be rearranged or otherwise modified such that other implementations are possible.

Figure 6:
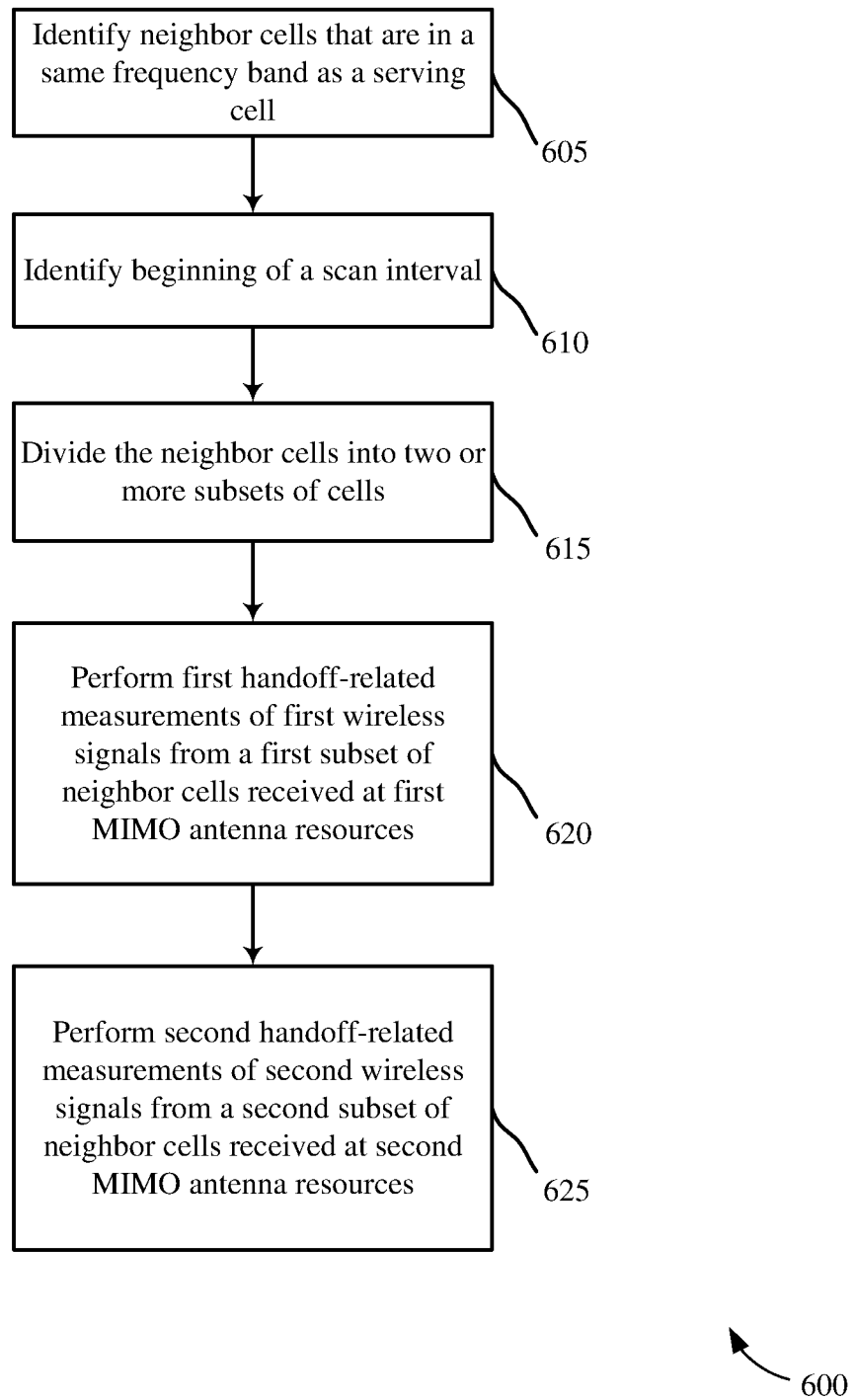
FIG. 6 shows a method to concurrently scan neighbor cells that operate in the same frequency band as the serving cell during the same scan interval using MIMO based antenna resources.

FIG. 6 shows an example of a method 600 to concurrently scan neighbor cells that operate in the same frequency band as the serving cell during the same scan interval using MIMO based antenna resources. In one configuration, the method 600 may be implemented by the mobile device, such as the mobile device 115 of FIG. 1, 2, 3, 4A, or 4B. In the example, the method 600 may be implemented by the detection module 405, the transceiver controller 284, and the measurement module 310 of the device 115 of FIG. 4A or 4B.

At block 605, neighbor cells that are in the same frequency band as the serving cell may be identified. This may further include identifying neighbor cells that provide the same RAT as the serving cell. At block 610, the beginning of a scan interval may be identified. At block 615, the identified neighbor cells may be divided into two or more subsets of cells. In one example, at block 620, first handoff-related measurements of first wireless signals may be performed during the scan interval. The first wireless signals may be from a first subset of neighbor cells and received at first MIMO antenna resources 315-a-1. In addition, at block 625, second handoff-related measurements of second wireless signals may be performed in parallel with the first handoff-related measurements. The second wireless signals may be from a second subset of neighbor cells and received at second MIMO antenna resources 315-a-2. In one example, the first and second handoff-related measurements may be power measurements, such as RSSI measurements, of the received signals. In another example, the handoff-related measurements may be signal quality measurements, such as, but not limited to, CINR, SNR, and the like.

Thus, the method 600 may provide for concurrently scanning neighbor cells that operate in the same frequency band or RAT as the serving cell during the same scan interval. It should be noted that the method 600 is just one implementation and that operations of the method 600 may be rearranged or otherwise modified such that other implementations are possible.

Figure 7:
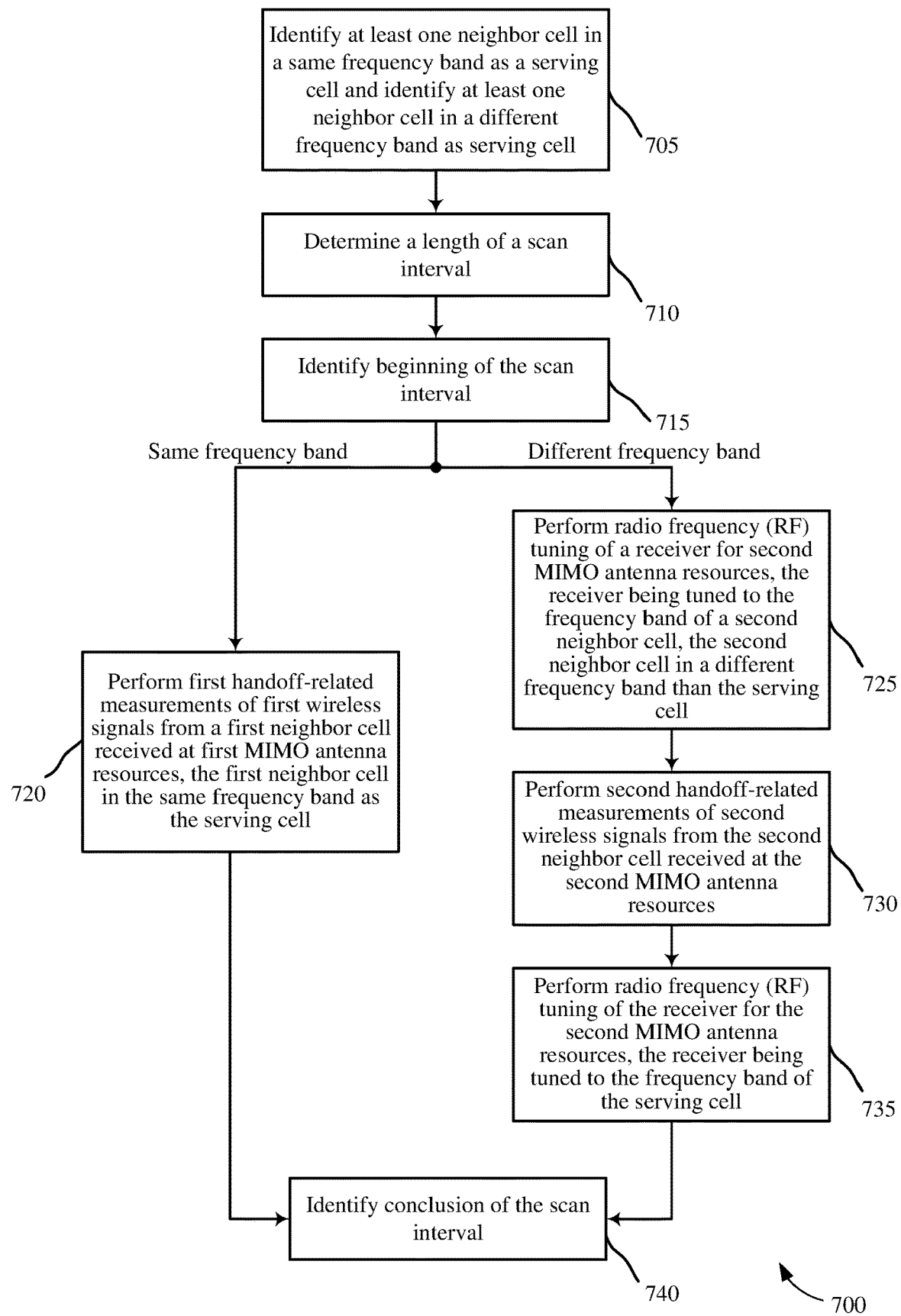
FIG. 7, shown a method of scanning multiple neighbor cells in parallel with at least one neighbor cell operating in a different frequency band and/or RAT than the serving cell and at least one neighbor cell sharing the same frequency and RAT as the serving cell.

Referring now to FIG. 7, an exemplary method 700 of scanning multiple neighbor cells in parallel with at least one neighbor cell operating in a different frequency band and/or RAT than the serving cell and at least one neighbor cell sharing the same frequency and RAT as the serving cell. In one example, the method 700 may be implemented by the mobile device 115 of FIG. 1, 2, 3, 4A, or 4B.

In one configuration, at block 705, at least one neighbor cell may be identified that is operating in the same frequency or with the same RAT as the serving cell. In addition, at least one neighbor cell operating in a different frequency band or with a different RAT as the serving cell is also identified. At block 710, a length of a scan interval is determined. At block 715, the beginning the scan interval is identified. For a first neighbor cell that is operating in the same frequency band or same RAT as the serving cell, first handoff-related measurements of first wireless signals are performed at block 720 during the scan interval. The first wireless signals may be received at first MIMO antenna resources 315-a-1 of the device 115.

For a second neighbor cell identified as operating in a different frequency band or different RAT than the serving cell, the steps described in blocks 725, 730, and 735 may be performed. For example, at block 725, at the beginning of the scan interval, a receiver associated with second MIMO antenna resources 315-a-2 of the device 115 may be tuned to the frequency band of the second neighbor cell. At block 730, the second MIMO antenna resources 315-a-2 may receive wireless signals from the second neighbor cell and second handoff-related measurements may be performed on the received signals. At block 735, after the measurements have been obtained and at the conclusion of the scan interval, the receiver associated with the second MIMO antenna resources 315-a-2 may be tuned to the frequency band of the serving cell.

Therefore, the method 700 may allow the mobile device 115 to scan, in parallel, neighbor cells that operate in the same frequency band or RAT as the serving cell and neighbor cells that provide different RATs and/or operate in different frequency bands. In some examples, a scan procedure of multiple neighbor cells may occur during the same scan interval regardless of the RAT or frequency band associated with each neighbor cell. It should be noted that the method 700 is just one implementation and that operations of the method 700 may be rearranged or otherwise modified such that other implementations are possible. Various examples of concurrent handoff-related measurements of cells operating in different frequency bands and RATs than the serving cell are now described. These various examples may be implemented through the method 700 described above and the architecture of the device 115.

Concurrent Power Measurement

In one configuration, during the scan interval (including future scan intervals and the period between adjacent scan intervals), the device 115 may dedicate the first MIMO antenna resources 315-a-1 to the serving cell. In other words the first MIMO antenna resource 315-a-1 may be dedicated to neighbor cells sharing the same frequency band or RAT as the serving cell. The second MIMO antenna resources 315-a-2 may be assigned to neighbor cells in a different frequency band or providing a different RAT than the serving cell. In one example, during the scan interval, the first MIMO antenna resources 315-a-1 may receive wireless signals from the neighbor cells and power measurements for these signals may be calculated. Further, during the same scan interval, the receiver associated with the second MIMO antennas 315-a-2 may be tuned to the different frequency band during a portion of the scan interval. After the tuning of the receiver is completed, power measurements of the signals received from the neighbor cells in a different frequency band are calculated. In one example, at the conclusion of the scan interval, the receiver may be tuned to the frequency band of the serving cell.

Concurrent Signal Quality Measurement

In one example, during each scan interval, the device 115 may use the MIMO antenna resources 315 to receive signals from neighbor cells and measure the signal quality measurement of each signal. In one configuration, the device 115 may calculate the signal quality measurement of each neighbor cell in a mutually exclusive manner. At the beginning of the scan interval, the first MIMO antenna resources 315-a-1 may begin to receive signals from neighbor cells sharing the same frequency and/or RAT as the serving cell, while a receiver associated with the second MIMO antenna resources 315-a-2 may be tuned to the frequency band of the neighbor cell providing the different RAT. After the tuning, the second MIMO antenna resources 315-a-2 may begin to receive the signals from the neighbor cells and the measurement module 310 may calculate a signal quality measurement for the signals received from the various neighbor cells. At the end of the scan interval, the receiver may be tuned to the frequency band of the serving cell. As a result, signal quality measurements of neighbor cells having similarities with the serving cell may be obtained in parallel with measurements of neighbor cells that are different than the serving cell using the architecture of the device 115.

Concurrent Power Measurement and Signal Quality Measurement

In one example, the device 115 may perform the power measurement on the neighbor cells sharing the same frequency and RAT as the serving cell and perform the signal quality measurement on the neighbor cells on a different frequency band and RAT. Under this scenario, the device 115 may use the concurrent power measurement approach described above to speed-up the measurements on the neighbor cells sharing the same frequency band with the serving cell (i.e., dividing the neighbor cells into subsets of cells). The device 115 may use the signal quality measurement approach described above to measure the neighbor cells on the different frequency. As a result, the power measurements and signal quality measurements may be calculated concurrently for different neighbor cells during the same scan interval.

In another example, the device 115 may perform the signal quality measurements on neighbor cells sharing the same frequency and RAT as the serving cell and perform the power measurements on neighbor cells belonging to different RAT and/or operating on a different frequency band. This example may provide two different options.

In the first option, the signal quality measurements and the power measurements may be mutually exclusive. For example, a scan interval may be dedicated to either calculating the signal quality measurement or the power measurement. If the scan interval is dedicated to obtaining the signal quality measurement, the concurrent signal quality measurement approach described above may be implemented. If, power measurements are to be calculated during the scan interval, the neighbor cells operating on the different frequency or belonging to a different RAT may be divided into a number of subsets, for example two subsets. The transceiver controller 284-b may dedicate the first MIMO antenna resources 315-a-1 to the first subset and the second MIMO antenna resources 315-a-2 to the second subset. At the beginning of the scan interval, the receivers of the two MIMO antennas may be tuned to the frequencies of the neighbor cells. After the tunings are completed, power measurements of the neighbor cells may be calculated in a concurrent way. At the end of the scan interval, the receivers of both MIMO antennas are tuned to the serving cell.

In the second option, the signal quality measurements and the power measurements may be performed concurrently. During each scan interval, for example, the transceiver controller 284-b may dedicate the first MIMO antenna resources 315-a-1 to the serving cell and the neighbor cells sharing the same frequency band as the serving BS, and the second MIMO antenna resources 315-a-2 to the neighbor cells having a different frequency band or RAT. During each scan interval, the device 115 may use a single input single output (SISO) approach to perform the signal quality measurements and the SISO approach to perform the power measurements. When power measurements are performed on the neighbor cells with different frequency bands, the receiver associated with the second MIMO antenna resources 315-a-2 may be tuned to the frequency band of the neighbor cell. After the tuning is completed, the measurement module 310-b may start to calculate power measurements of signals received from the neighbor cells on the different frequency band or RAT. At the end of the scan interval, the receiver may be tuned to the serving cell.

Figure 8:
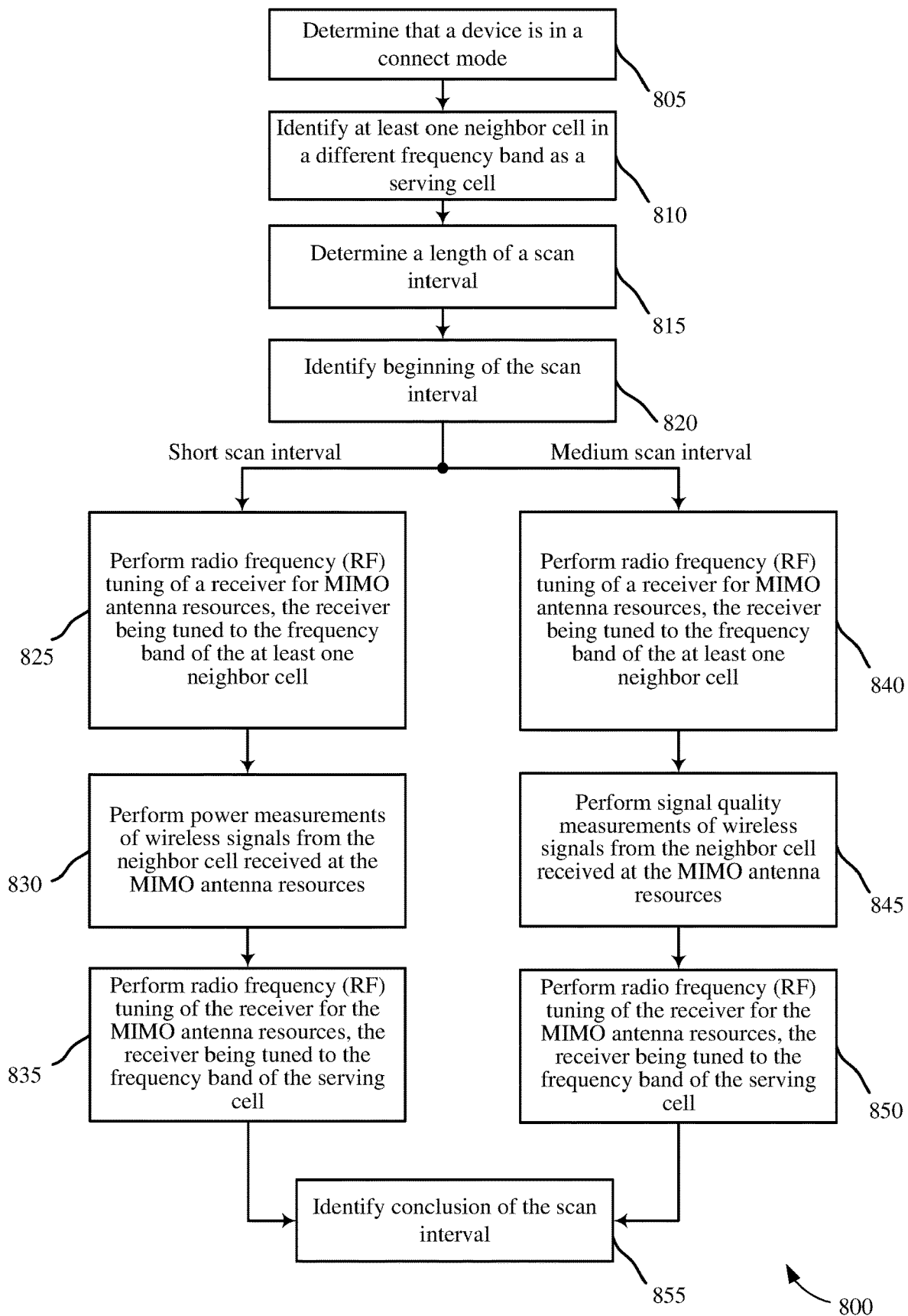
FIG. 8, shows a method to determine the type of measurement to calculate based on a determined length of a scan interval while the device is in a connect mode.

Referring now to FIG. 8, an example of a method 800 is provided to determine the type of measurement to calculate based on a determined length of a scan interval while the device 115 is in a connect mode. In one configuration, the method 800 may be implemented by the device 115 of FIG. 1, 2, 3, 4A, or 4B.

At block 805, a determination may be made that the device 115 is in a connected mode. For example, the device may be in active communications with a serving base station. At block 810, at least one neighbor cell in a different frequency band or RAT may be identified. At block 815, the length of the scan interval may be determined. At block 820, the beginning of the scan interval may be identified.

In one configuration, if the length of the scan interval is short, power measurements may be performed on neighbor cells operating in a different frequency band. At block 825, a receiver associated with MIMO antenna resources 315 may be tuned to the frequency of the different frequency band. At block 830, power measurements may be performed on wireless signals received from the neighbor cells. In addition, at block 835, the receiver may be tuned back to the frequency band of the serving cell. At block 855, the conclusion of the scan interval may be identified.

In one configuration, if the length of the scan interval is longer, signal quality measurements may be performed on neighbor cells operating in a different frequency. At block 840, a receiver associated with MIMO antenna resources 315 may be tuned to the frequency of the different frequency band. At block 845, signal quality measurements may be performed on wireless signals received from the neighbor cells. At block 850, the receiver may be tuned to the frequency band of the serving cell. At block 855, the scan interval may conclude.

In one configuration, while the power measurements or signal quality measurements (depending on the length of the scan interval) are being performed on the neighbor cells operating in a different frequency band or RAT than the serving cell, the device 115 may concurrently perform other types of measurements on neighbor cells sharing the same frequency or RAT as the serving cell. The type of measurement to perform may be based on the amount of tuning needed, as well (as more tuning may further reduce the actual amount of time for scanning within the scan interval). As a result, during a scan interval when the device 115 is in a connected mode, the device 115 may perform power measurements or signal quality measurements on neighbor cells with a different frequency band in parallel with performing other types of measurements (e.g., power measurements, signal quality measurements, etc.) on neighbor cells with the same frequency band, as provided above with the various examples. It should be noted that the method 800 is just one implementation and that operations of the method 800 may be rearranged or otherwise modified such that other implementations are possible.

Figure 9:
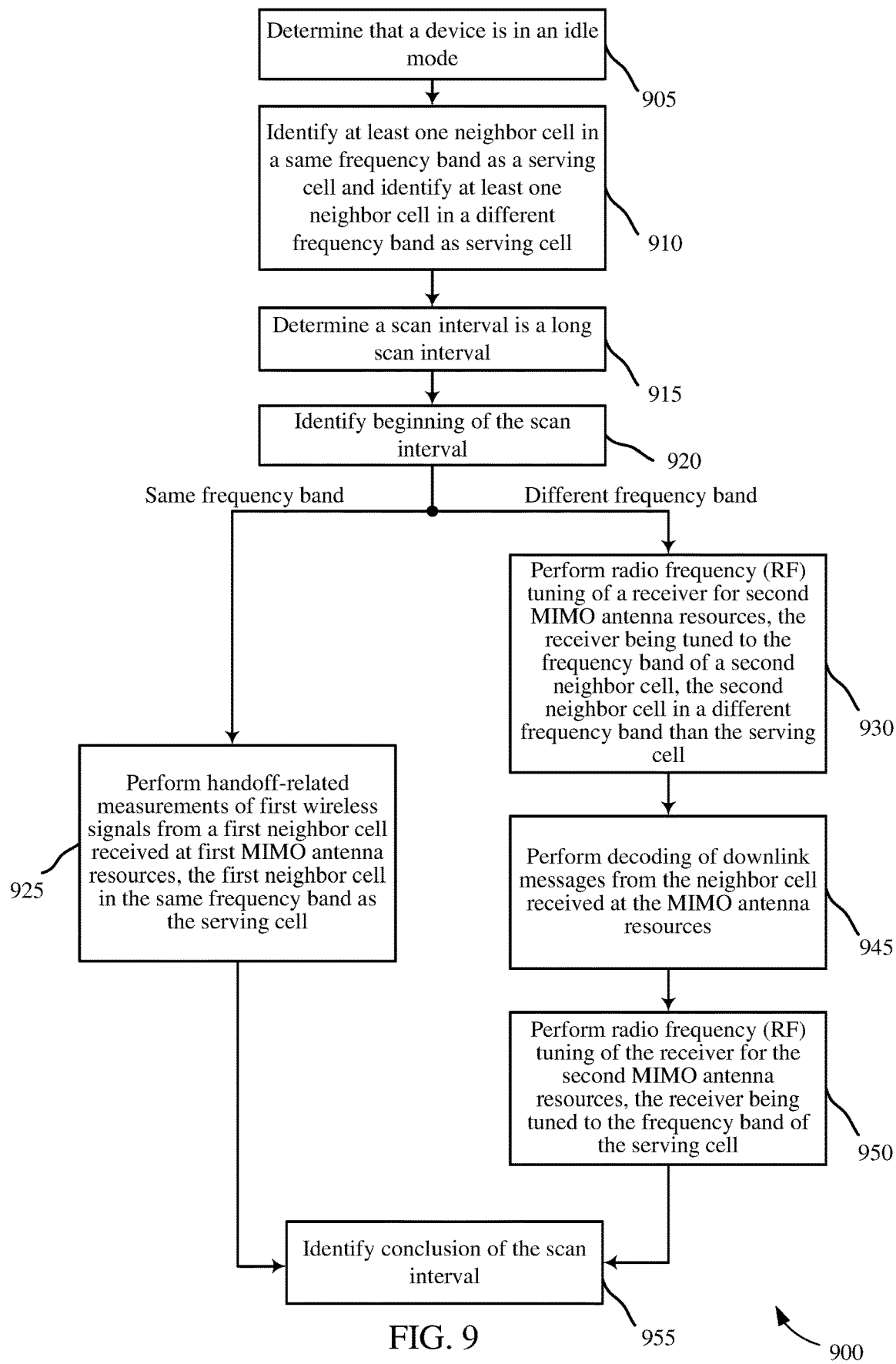
FIG. 9 shows a method to determine the type of measurement to calculate based on the mode of the device and a determined length of a scan interval.

Referring now to FIG. 9, an example of a method 900 is provided to determine the type of measurement to calculate based on the mode of the device 115 and a determined length of a scan interval. In one configuration, the method 900 may be implemented by the device 115 of FIG. 1, 2, 3, 4A, or 4B.

At block 905, a determination may be made that the device 115 is in an idle mode. For example, the device may not be in active communications with a serving base station. At block 910, at least one neighbor cell in the same frequency band or RAT as the serving cell and at least one neighbor cell in a different frequency band or RAT may be identified. At block 915, the length of the scan interval may be determined. For example, it may be determined that the length of the scan interval is a long interval. At block 920, the beginning of the scan interval may be identified.

In one configuration, at block 925, handoff-related measurements of first wireless signals may be calculated. The signals may be received from the neighbor cells sharing the same frequency band or RAT as the serving cell. At block 930, a receiver associated with second MIMO antennas 315-*a*-2 may be tuned to the different frequency band of the neighbor cells. Signals may be received from these neighbor cells after the tuning in completed. In one configuration, a DL encoded message may be received. At block 945, the DL message may be decoded to provide information regarding the neighbor cells. For example, timing information, power characteristics, offset information, etc. for the neighbor cell may be included in the DL message. At block 950, the receiver may be tuned back to the serving cell. At block 955, the conclusion of the scan interval is identified.

Thus, the method 900 allows the device 115, while in idle mode, to use MIMO antenna resources to concurrently decode DL messages received from neighbor cells operating in a different frequency band or RAT and perform handoff-related measurements for cells that operate in the same or different frequency band than the serving cell. It should be noted that the method 900 is just one implementation and that operations of the method 900 may be rearranged or otherwise modified such that other implementations are possible.

As provided by the description above, scan intervals may be used to perform handoff-related measurements and other types of measurements on neighbor cells in a different frequency or different RAT than a serving cell in parallel with existing scan procedures (i.e., performing measurements for neighbor cells in the same frequency band). The scan procedure described above allows the mobile device 115 to concurrently perform measurements of neighbor cells with the same frequency band or RAT as the serving cell with neighbor cells operating in a different frequency band or RAT during the same scan interval.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method comprising:
   determining a type of handoff-related measurement to perform based on a determined length of a scan interval;
   performing first handoff-related measurements of first wireless signals from a first neighbor cell received at first multiple input multiple output (MIMO) antenna resources of a device, wherein the device is in communication with a serving cell; and
   performing second handoff-related measurements of second wireless signals from a second neighbor cell received at second MIMO antenna resources of the device, the second wireless signals received at the second MIMO antenna resources concurrently with the first wireless signals being received at the first MIMO antenna resources.

2. The method of claim 1, further comprising:
   performing the first handoff-related measurements and the second handoff-related measurements during the scan interval.

3. The method of claim 2, further comprising:
   determining whether the device is in a connect mode or an idle mode; and
   determining the length of the scan interval.

4. The method of claim 1, wherein,
   the first handoff-related measurements and the second handoff-related measurements comprise a power measurement.

5. The method of claim 1, wherein,
   the first handoff-related measurements and the second handoff related measurements comprise a signal quality measurement.

6. The method of claim 5, wherein,
   the signal quality measurement comprises a signal-to-noise ratio (SNR), a carrier to interference-plus-noise-ratio (CINR), a bit error ratio (BER), an energy per bit to noise power spectral density ratio (Eb/NO), or an energy per symbol per noise power spectral density ratio (ES/NO).

7. The method of claim 1, wherein,
   the first handoff-related measurements comprise a power measurement and the second handoff-related measurement comprises a signal quality.

8. The method of claim 1, further comprising:
   decoding a first downlink message received at the first MIMO antenna resources from the first neighbor cell and decoding a second downlink message received at the second MIMO antennas from the second neighbor cell.

9. The method of claim 1, wherein,
   the first neighbor cell is in a different frequency band from the serving cell; and
   the second neighbor cell is in a different frequency band from the serving cell.

10. The method of claim 9, further comprising:
    tuning a receiver associated with the first MIMO antenna resources during a first period of the scan interval to the frequency band of the first neighbor cell; and
    tuning a receiver associated with the second MIMO antenna resources during a first period of the scan interval to the frequency band of the second neighbor cell.

11. The method of claim 9, further comprising:
    tuning a receiver associated with the first MIMO antenna resources and the second MIMO antenna resources during a second period of the scan interval to frequency band of the serving cell.

12. The method of claim 1, wherein,
    the first neighbor cell comprises a first radio access technology (RAT); and
    the second neighbor cell comprises the first RAT.

13. The method of claim 12, wherein,
    the second neighbor cell is in a different frequency band from the serving cell.

14. The method of claim 12, wherein,
    the serving cell comprises the first RAT.

15. The method of claim 1, wherein,
    the first neighbor cell comprises a first radio access technology (RAT); and
    the second neighbor cell comprises a second RAT different from the first RAT.

16. The method of claim 15, wherein,
    the first neighbor cell is in a same frequency band as the serving cell;
    the second neighbor cell is in a different frequency band from the serving cell; and
    the serving cell comprises the first RAT.

17. A device comprising:
    a plurality of multiple input multiple output (MIMO) antenna resources;
    a transceiver coupled with the plurality of MIMO antenna resources;
    a detection module in communications with the transceiver, the detection module configured to determine a length of a scan interval;
    a measurement module coupled with the transceiver and configured to:
      determine a type of handoff-related measurement to perform based on the determined length of the scan interval;
      perform first handoff-related measurements of first wireless signals from a first neighbor cell received at first MIMO antenna resources of the plurality of MIMO antenna resources, wherein the device is in communication with a serving cell; and
      perform second handoff-related measurements of second wireless signals from a second neighbor cell received at second MIMO antenna resources of the plurality of MIMO antenna resources, the second wireless signals received at the second MIMO antenna resources concurrently with the first wireless signals being received at the first MIMO antenna resources.

18. The device of claim 17, wherein, the measurement module is configured to perform the first handoff-related measurements and the second handoff-related measurements during the scan interval.

19. The device of claim 18, wherein, the detection module is configured to determine whether the device is in a connect mode or an idle mode.

20. The device of claim 17, wherein, the first handoff-related measurements and the second handoff-related measurements comprise a power measurement.

21. A device, comprising:

a plurality of multiple input multiple output (MIMO) antenna resources;

a transceiver coupled with the plurality of MIMO antenna resources;

a processor;

memory in electronic communication with the processor; and instructions stored in the memory, the instructions being executable by the processor to:

determine a length of a scan interval;

determine a type of handoff-related measurement to perform based on the determined length of the scan interval;

perform first handoff-related measurements of first wireless signals from a first neighbor cell received at first MIMO antenna resources of the plurality of MIMO antenna resources, wherein the device is in communication with a serving cell; and perform second handoff-related measurements of second wireless signals from a second neighbor cell received at second MIMO antenna resources of the plurality of MIMO antenna resources, the second wireless signals received at the second MIMO antenna resources concurrently with the first wireless signals being received at the first MIMO antenna resources.

22. The device of claim 21, wherein the instructions are executable by the processor to perform the first handoff-related measurements and the second handoff-related measurements during the scan interval.

23. The device of claim 22, wherein the instructions are executable by the processor to determine whether the device is in a connect mode or an idle mode.

24. The device of claim 21, wherein the first handoff-related measurements and the second handoff-related measurements comprise a power measurement.

* * * * *